(12) United States Patent
Viehland et al.

(10) Patent No.: US 7,421,682 B2
(45) Date of Patent: Sep. 2, 2008

(54) INSTRUMENTATION INJECTION FOR COMMON LANGUAGE RUNTIME

(75) Inventors: Robert E. Viehland, Redmond, WA (US); Brandon Scott Wadsworth, Redmond, WA (US); Stephen Craig Schertz, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 10/705,754

(22) Filed: Nov. 10, 2003

(65) Prior Publication Data

US 2005/0102656 A1    May 12, 2005

(51) Int. Cl.
*G06F 9/44* (2006.01)
(52) U.S. Cl. .................. 717/130; 717/148; 717/158; 714/35
(58) Field of Classification Search ............. 717/130, 717/148, 158; 714/35
See application file for complete search history.

(56) References Cited

U.S. PATENT DOCUMENTS

| | | | |
|---|---|---|---|
| 5,628,017 A | | 5/1997 | Kimmerly et al. |
| 6,077,312 A | * | 6/2000 | Bates et al. ............ 717/129 |
| 6,314,558 B1 | * | 11/2001 | Angel et al. ............ 717/118 |
| 6,493,834 B1 | | 12/2002 | Bates et al. |
| 6,543,049 B1 | | 4/2003 | Bates et al. |
| 6,560,774 B1 | | 5/2003 | Gordon et al. |
| 2003/0149960 A1 | * | 8/2003 | Inamdar .................. 717/118 |

OTHER PUBLICATIONS

"Recompilation for debugging support in a JIT-complier", Tikir et al., Software Engineering Notes, vol. 28, No. 1, Nov. 2002, pp. 10-17.
"Dynamic event generation for runtime checking using the JDI", Brorkens et al., Electronic Notes in Theoretical Computer Science, vol. 70, No. 4, Jul. 2002, pp. 1-15.
"Towards measurement of testability of concurrent object-oriented programs using fault insertion: a preliminary investigation", Ghosh, S., Proceedings Second IEEE International Workshop on Source Code Analysis and Manipulation, Oct. 2002, pp. 1-9.
"CLR debugging—Improve your understanding of .NET internals by building a debugger for managed code", Pellegrino, M., MSDN Magazine, Nov. 2002, vol. 17, No. 11, pp. 89-96, 99-103.

* cited by examiner

*Primary Examiner*—Lewis A. Bullock, Jr.
*Assistant Examiner*—Michael Yaary
(74) *Attorney, Agent, or Firm*—Lee & Hayes, PLLC

(57) ABSTRACT

An exemplary media implementation precipitates a device to perform actions including: determining if an instruction of a line of common intermediate language (CIL) code meets a predetermined exception-related criterion; and if so, injecting a decision point in association with the instruction of the line of CIL code, the decision point enabling a decision as to whether an exception is to be thrown with respect to the instruction. An exemplary device implementation includes: instrumented CIL code that includes a test couplet corresponding to a decision point and an associated instruction, the associated instruction capable of causing a fault; a decision runtime library that is adapted to evaluate the test couplet to selectively decide whether to throw an exception with respect to the associated instruction; and a common language runtime component that interprets the decision point so as to call the decision runtime library prior to executing the associated instruction.

27 Claims, 7 Drawing Sheets

INSTRUMENTATION INJECTION FOR COMMON LANGUAGE RUNTIME

TECHNICAL FIELD

This disclosure relates in general to reliability testing for code and in particular, by way of example but not limitation, to injecting instrumentation instructions into code with regard to a common language runtime (CLR) environment.

BACKGROUND

Computer programs impact every phase of modern life from communication to transportation, from entertainment to education, from finance to manufacturing, and so forth. As evident from personal productivity desktop applications, for example, features and abilities provided by computer programs are constantly expanding and increasing. Concomitantly, the size and complexity of such computer programs is also expanding and increasing. The larger size and greater complexity of modern computer programs present ever-increasing challenges to the software engineers that are responsible for producing error-less and trouble-free software code.

Some software engineers are charged with testing such software code to ensure high reliability. They attempt to test every facet of the software code in as many different operational phases and situations as possible, which is a daunting if not genuinely unbounded goal. Unfortunately, this reliability testing is further exacerbated by the multitude of different programming environments, each of which may introduce additional individual picayune requirements. Accordingly, there is a need for schemes and techniques that facilitate software code testing in one or more diverse programming environments, such as a CLR environment.

SUMMARY

In an exemplary media implementation, one or more processor-accessible media include processor-executable instructions that, when executed, direct a device to perform actions including: determining if an instruction of a line of common intermediate language code meets a predetermined exception-related criterion; and if so, injecting a decision point in association with the instruction of the line of common intermediate language code, the decision point enabling a decision as to whether an exception is to be thrown with respect to the instruction.

In an exemplary device implementation, a device includes: instrumented common intermediate language code that includes a test couplet corresponding to a decision point and an associated instruction, the associated instruction capable of causing a fault; a decision runtime library that is adapted to evaluate the test couplet to selectively decide whether to throw an exception with respect to the associated instruction; and a common language runtime component that interprets the decision point so as to call the decision runtime library prior to executing the associated instruction.

Other method, system, apparatus, approach, application programming interface (API), device, procedure, media, scheme, technique, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
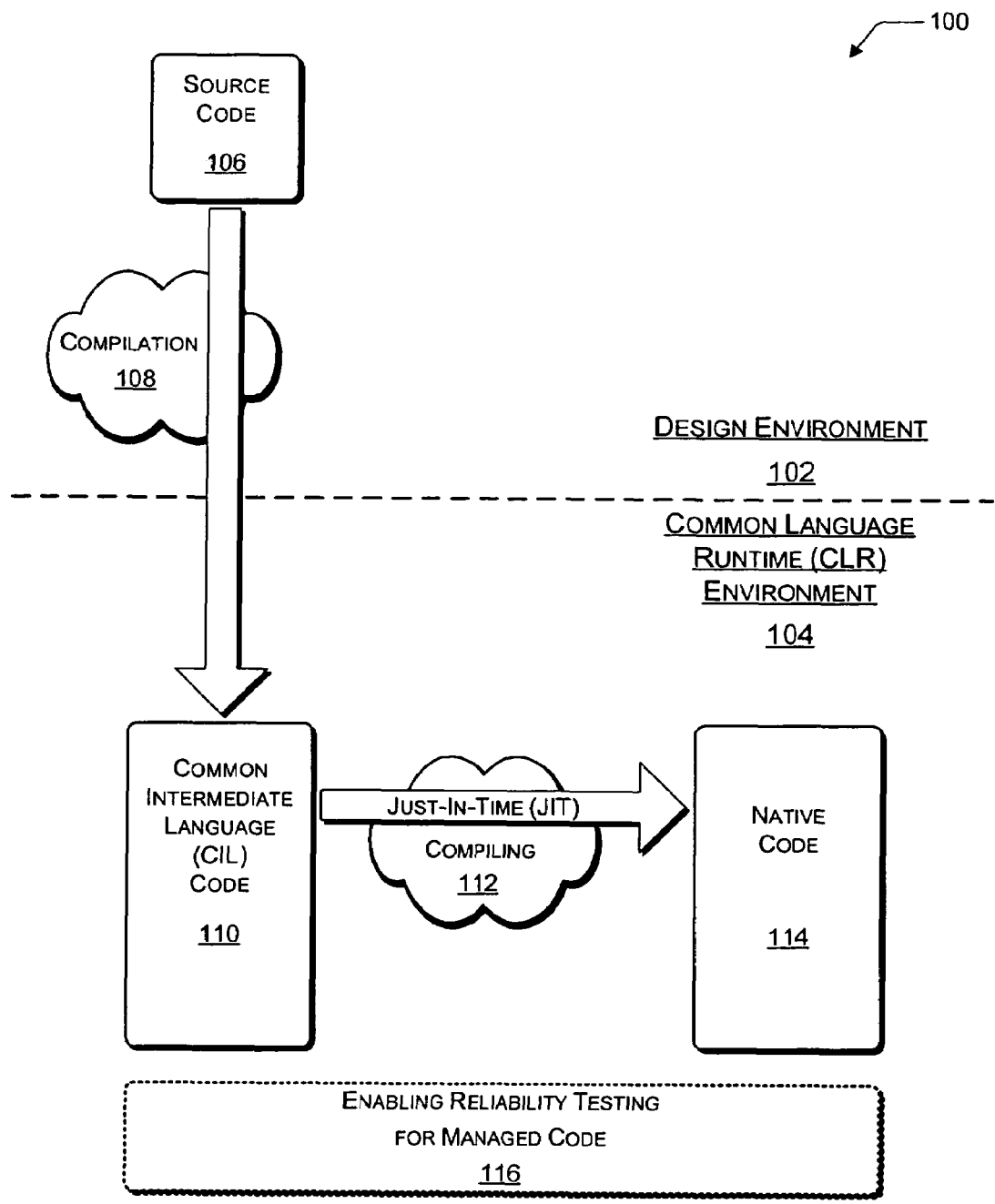
FIG. 1 illustrates programming environments that include an exemplary common language runtime (CLR) environment in which reliability testing for managed code may be enabled.

FIG. 1 illustrates programming environments 100 that include an exemplary common language runtime (CLR) environment 104 in which reliability testing for managed code may be enabled 116. In addition to CLR environment 104, programming environments 100 also include a design environment 102. In design environment 102, a program designer creates source code 106. Source code 106 may be produced in any of a myriad of languages, such as C++, C#, Visual Basic (VB), JScript, Cobol, Fortran, Pascal, and so forth.

Source code 106 undergoes compilation 108 to produce common intermediate language (CIL) code 110. Although not explicitly shown, compilation 108 of source code 106 also typically produces metadata for utilization in CLR environment 104.

CIL code 110 is usable as managed code in a CLR environment 104. In CLR environment 104, CIL code 110 is just-in-time (JIT) compiled 112 into native code 114. Native code 114 may be in a machine language that is processor-consumable for a particular device type. Thus, particular instruction lines of CIL code 110 are JIT compiled 112 by a CLR component 104 as the particular instruction lines are due to be executed or otherwise utilized.

Users prefer that CIL code 110 be errorless and trouble-free. Hence, a tester (which may be the same individual(s) as the developer of source code 106) is tasked with verifying that any exceptions that may result from executing CIL code 110 are properly handled, to the extent reasonably possible or desired, without causing a program crash (e.g., without causing a failure of a CLR component 104). In other words, loss of data, unintended program cessation, user confusion and/or inconvenience, etc. may be minimized or at least reduced with proper and thorough testing. Enabling reliability testing 116 for the managed code of CIL code 110 in CLR environment 104 is therefore described below.

Figure 2:
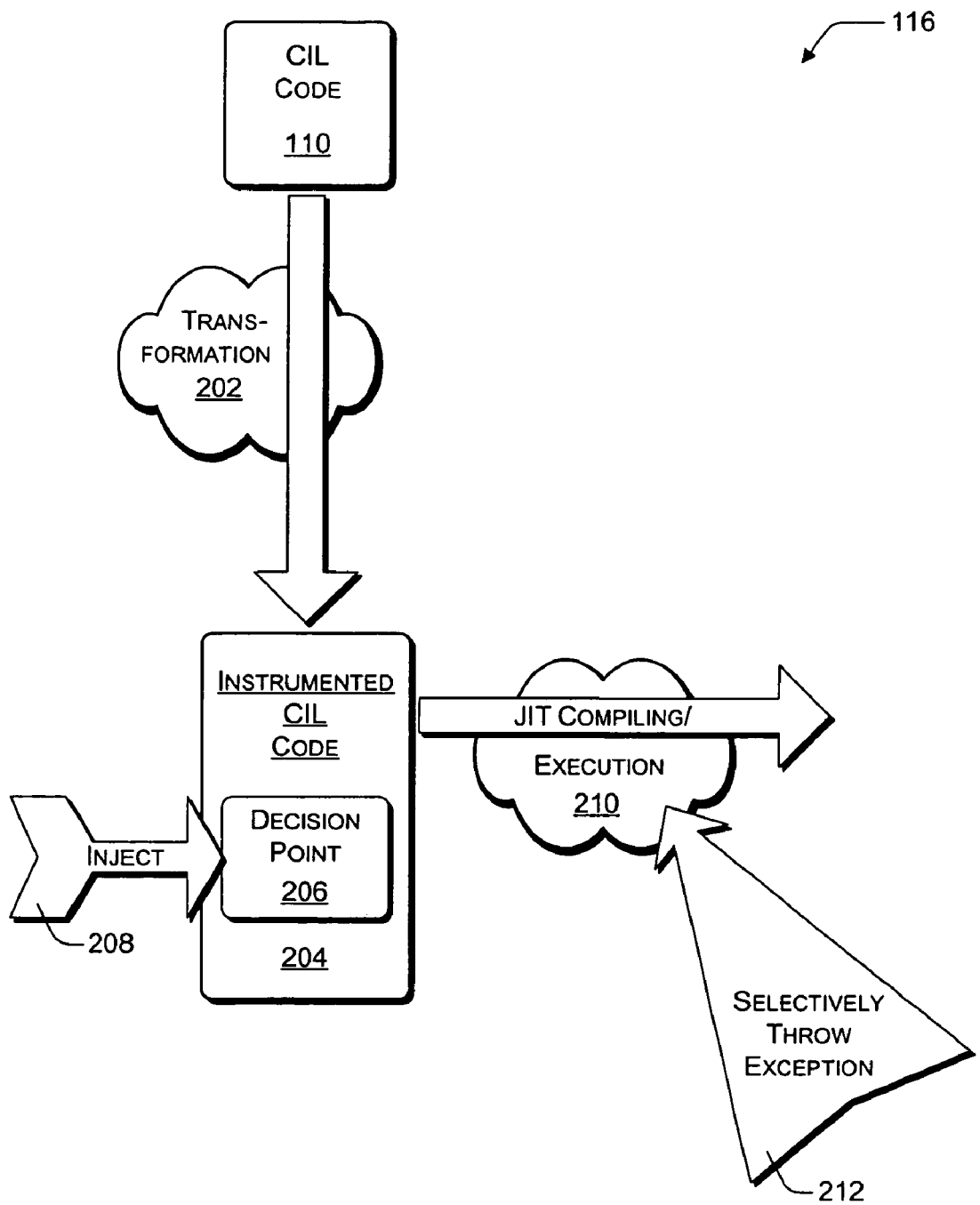
FIG. 2 illustrates an exemplary approach to enabling reliability testing with instrumentation injection and the selective throwing of exceptions.

FIG. 2 illustrates an exemplary approach to enabling reliability testing 116 with instrumentation injection 208 and the selective throwing of exceptions 212. CIL code 110 (e.g., in binary form) undergoes transformation 202 and results in instrumented CIL code 204. Generally, transformation 202 accepts as input CIL code 110 and injects 208 decision points 206 into such code to produce instrumented CIL code 204. This instrumented CIL code 204 can persist on disk and need not be created on-the-fly.

Specifically in a described implementation, for each line of CIL code 110 that includes an instruction which may cause an exception, transformation 202 causes a decision point 206 to be injected 208 thereat. Injecting 208 decision points 206 into CIL code 110 thus produces instrumented CIL code 204. Each decision point 206 serves as a bookmark for an instruction that may result in an exception and that can therefore be evaluated (e.g., considered for further analysis) during an execution phase of reliability testing.

In an execution phase of reliability testing, instrumented CIL code 204 is JIT compiled and executed 210. During execution 210, an exception can be selectively thrown 212 at each decision point 206 of instrumented CIL code 204. An exemplary instrumentation tool for injection 208 of decision points 206 is described further below with reference to FIG. 3. An exemplary decision point 206 is described further below with reference to FIG. 4. And an exemplary decision runtime library (DRL) for selectively throwing exceptions 212 is described further below with reference to FIG. 5.

Figure 3:
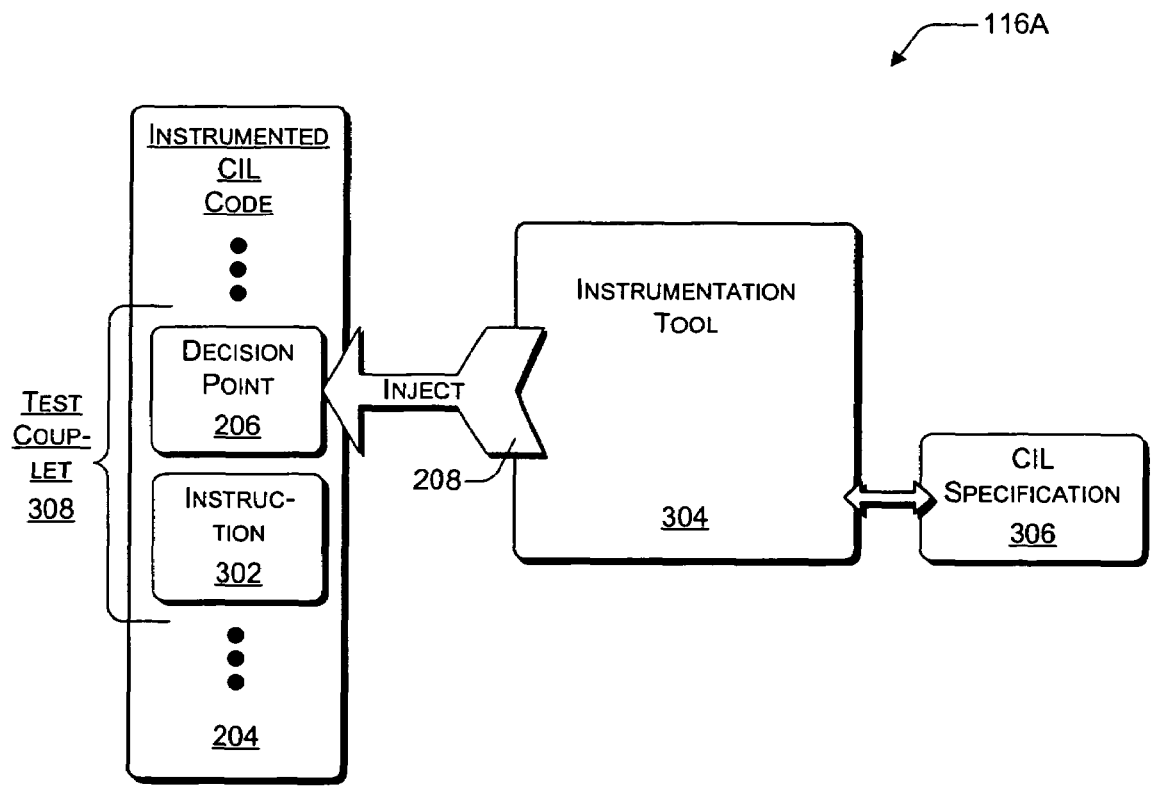
FIG. 3 illustrates an exemplary instrumentation injection scheme including an instrumentation tool that injects decision points.

FIG. 3 illustrates an exemplary instrumentation injection scheme 116A including an instrumentation tool 304 that injects 208 decision points 206. Instrumentation tool 304 causes decision points 206 to be injected 208 into instrumented CIL code 204 at certain lines of code. Instrumented CIL code 204 includes multiple (e.g., tens, hundreds, thousands, or more) lines of such code.

As illustrated, each line of code may include an instruction 302. If execution of instruction 302 can result in an exception, instrumentation tool 304 causes a decision point 206 to be injected 208 into instrumented CIL code 204 (e.g., immediately) prior to instruction 302.

Decision point 206 and instruction 302 together form a test couplet 308 that are evaluated during an execution phase of reliability testing. Instrumentation at the CIL instruction level, as opposed to at a source code level, can increase reliability testing flexibility, can expand the applicability of reliability testing to a greater number of languages without language-specific tailoring, can permit exception targeting to a finer degree, and so forth.

Generally, instrumentation tool 304 is capable of progressing through instrumented CIL code 204 and analyzing each instruction 302 thereof to determine if it meets a predetermined exception-related criterion. If so, instrumentation tool 304 is adapted to inject 208 a decision point 206 into instrumented CIL code 204 in association with instruction 302 (e.g., as a corresponding test couplet 308).

In a described implementation, instrumentation tool 304 determines if each instruction 302 meets a predetermined exception-related criterion by determining if instruction 302 can result in an exception with reference to CIL specification 306. CIL specification 306, possibly in addition to other information, lists available and/or possible instructions for CIL code 110 and indicates which instructions can result in an exception. Furthermore, CIL specification 306 indicates what type(s) of exceptions can be thrown for each listed instruction.

Using CIL specification 306 is one (relatively exhaustive) manner for determining whether a given instruction comports with a predetermined exception-related criterion. Alternatively, instructions may be considered as meeting the predetermined exception-related criterion if they are known to be prone to failure. For example, instructions that allocate memory are prone to resulting in exceptions. Memory allocation instructions include "newobj", "box", "callvirt", and so forth. Thus, memory allocations may be considered a category of likely exceptions. Other exception categories include security-related instructions, disk input/output calls, arithmetic overflow, divide by zero, missing method exception, type load exception, and so forth.

Figure 4:
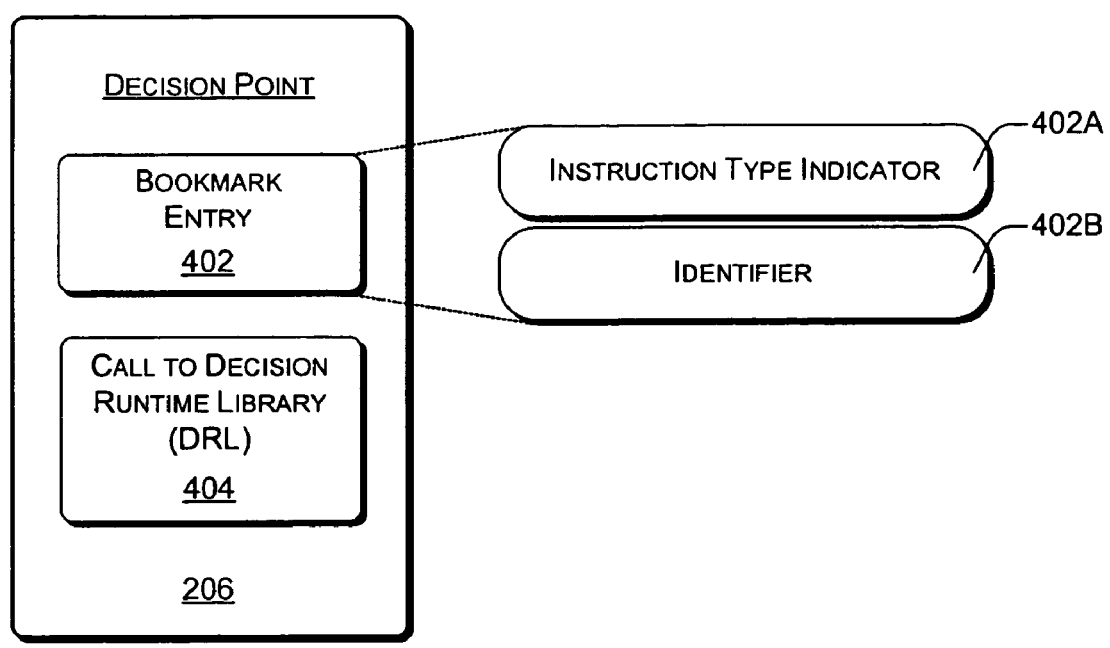
FIG. 4 illustrates an exemplary decision point.

FIG. 4 illustrates an exemplary decision point 206. Decision point 206 is implemented as one or more injected lines of code. As illustrated, decision point 206 includes a bookmark entry 402 and a call to DRL 404. During an execution phase of reliability testing, when call to DRL 404 is encountered in instrumented CIL code 204, CLR component 104 passes control to a DRL module, which is described further below with reference to FIG. 5. The DRL module uses bookmark entry 402 when selectively deciding whether to throw an exception with respect to an associated instruction 302 (of FIG. 3) of a corresponding test couplet 308.

In a described implementation, bookmark entry 402 includes an instruction type indicator 402A and an identifier 402B. Instruction type indicator 402A indicates the type of instruction of the associated instruction 302. The instruction type may be indicated by a name, a numeral, an alphanumeric variable generally, some combination thereof, and so forth. Identifier 402B comprises a value that uniquely identifies each decision point 206. For example, identifier 402B may be formed from an incrementing counter.

An exemplary decision point 206 is described now in the context of a "divide instruction" that can cause an exception if CIL code 110 attempts to divide by zero. For an original CIL stream (e.g., from CIL code 110):

```
...
"Divide Dividend by Divisor"
...
```

For an instrumented CIL stream (e.g., from instrumented CIL code 204):

```
...
ldc.i4 ABCxMNO [1]
call void DRL module [2]
"Divide Dividend by Divisor"
...
```

In the exemplary instrumented CIL stream above, two instruction lines [1] and [2] are used to realize decision point 206. The first line [1] implements bookmark entry 402, and the second line [2] implements call to DRL 404. The first line [1] loads a code ABCxMNO that jointly includes both instruction type indicator 402A and identifier 402B, with "ABC" representing instruction type indicator 402A and "MNO" representing identifier 402B. Alternatively, bookmark entry 402 may be implemented with two separate lines, one for each of instruction type indicator 402A and identifier 402B. The second line [2] makes a call to the DRL module; it includes 'void ' so that the lines of instrumentation (e.g., decision points 206) do not affect the overall programmatic execution.

Figure 5:
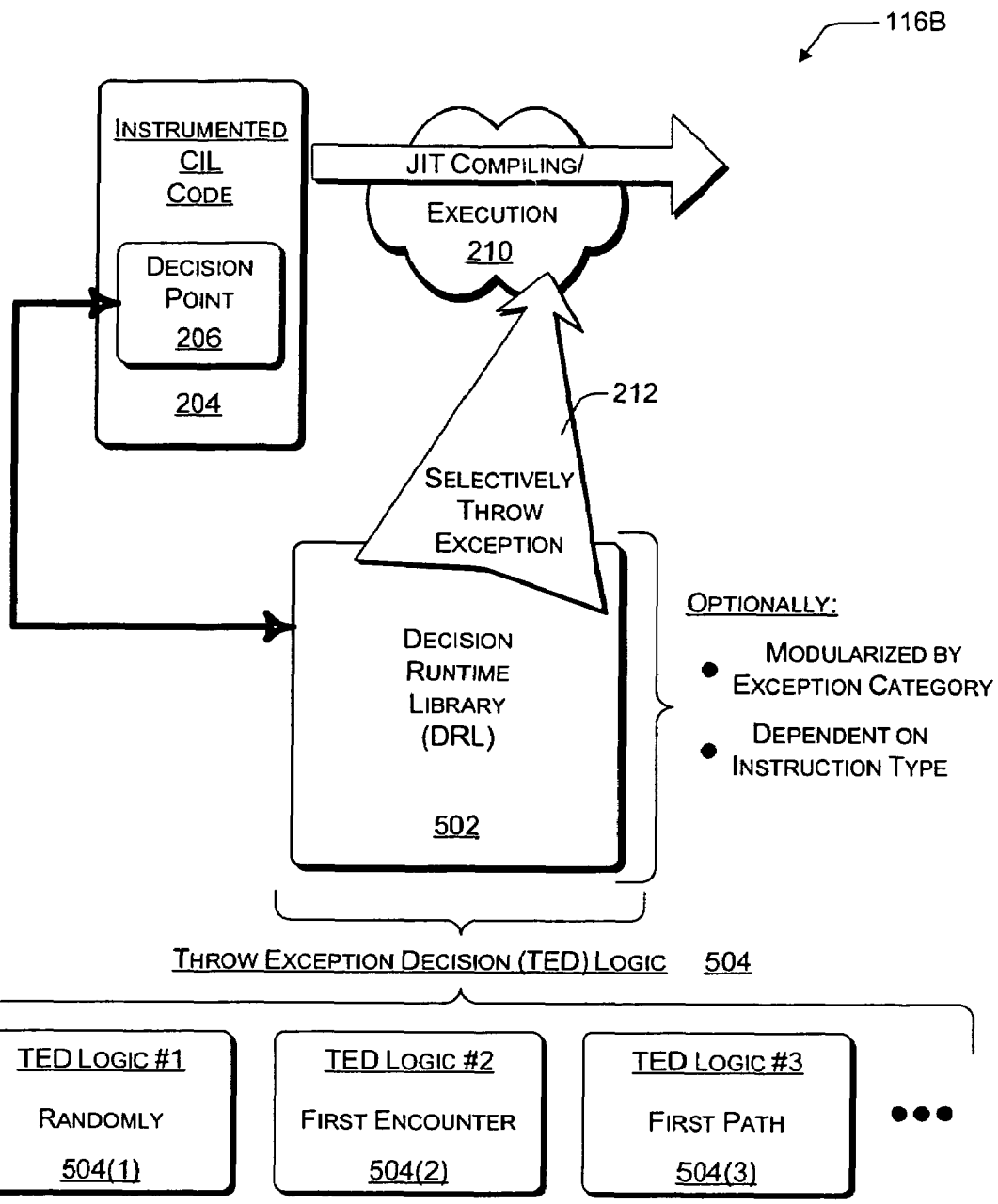
FIG. 5 illustrates an exemplary selective exception-throwing scheme that includes a decision runtime library (DRL).

FIG. 5 illustrates an exemplary selective exception-throwing scheme 116B that includes a DRL 502. During JIT compiling/execution 210 of instrumented CIL code 204 by CLR component 104, injected decision points 206 are reached from time to time. When a decision point 206 is detected, DRL 502 is called (e.g., as a result of a call to DRL 404).

In a described implementation, DRL 502 is adapted to selectively decide whether to throw an exception (e.g., induce a failure) for an instruction 302 (of FIG. 3) that is associated with decision point 206 as part of a corresponding test couplet 308. If an exception is thrown, DRL 502 consequently simulates an appropriate error condition in order to enable the testing of CIL code 110 for reliability. For example, an out of memory error condition can be induced for a decision point 206 that is associated with a memory allocation type of instruction 302. DRL 502 makes a selective decision regarding whether to throw an exception responsive to bookmark entry 402, which includes instruction type indicator 402A and identifier 402B.

DRL 502 may be implemented in any of many manners, including extensible manners. For example, DRL 502 may be capable of handling any exception category and any instruction type. Alternatively, DRL 502 may be targeted for one or more specific exception categories and/or one or more specific instruction types. Thus, as indicated in FIG. 5, DRLs 502 may optionally be targeted by exception area. For example, they may be modularized by exception category and/or dependent on instruction type. This permits program testers with individual testing interests or tasks to focus on desired exception areas when testing the reliability of a particular CIL code 110/instrumented CIL code 204.

As illustrated, DRL 502 is capable of making a selective decision regarding whether to throw an exception responsive to bookmark entry 402 and based on at least one throw exception decision (TED) logic factor 504. Although three exemplary TED logic factors 504(1, 2, 3) are shown, four or more TED logic factors 504 may alternatively be employed by DRL 502 either individually or jointly.

TED logic factor 504(1) causes a decision regarding whether to throw an exception to be made based on a random determination. For example, DRL 502 may be configured such that it induces a fault on a particular instruction type, as indicated by instruction type indicator 402A, half of the time. TED logic factor 504(2) causes a decision regarding whether to throw an exception to be made based on whether the instruction 302 that is associated with the decision point 206 that is being evaluated has been previously encountered. For example, DRL 502 may be configured such that it induces a fault on a first occurrence of any given instruction 302, as identified by identifier 402B of bookmark entry 402. TED logic factor 504(3) causes a decision regarding whether to throw an exception to be made based on whether the instruction 302 that is associated with the decision point 206 that is being evaluated has been previously reached by a current program path. For example, DRL 502 may be configured such that it induces a fault a first time that a particular instruction 302 is reached from a particular calling routine.

Hence, DRL 502 may utilize any one or more of many possible exemplary TED logic factors 504, including those illustrated in FIG. 5. Additional TED logic factor 504 examples follow. For example, DRL 502 can always induce a fault at each decision point 206 for all instruction types or a subset thereof. As another example, DRL 502 can factor into the exception decision selectivity evaluation what method was previously called. As yet another example, DRL 502 can ascertain at what location instrumented CIL code 204 is being executed from a programmatic perspective. A stack walk can be performed to ascertain who the previous caller is. This TED logic factor 504 may be employed when a particular instruction 302, and its associated decision point 206 for a corresponding test couplet 308, may be encountered in two programmatic locations and a failure is to be induced at each calling.

Transformation 202 (at FIG. 2) of CIL code 110 to produce instrumented CIL code 204 thus introduces a new dependency for the execution thereof. In other words, to execute the binary form of instrumented CIL code 204 (at least when performing reliability testing thereon), DRL 502 is utilized in addition to any other libraries that are already utilized when executing the binary form of CIL code 110.

Figure 6:
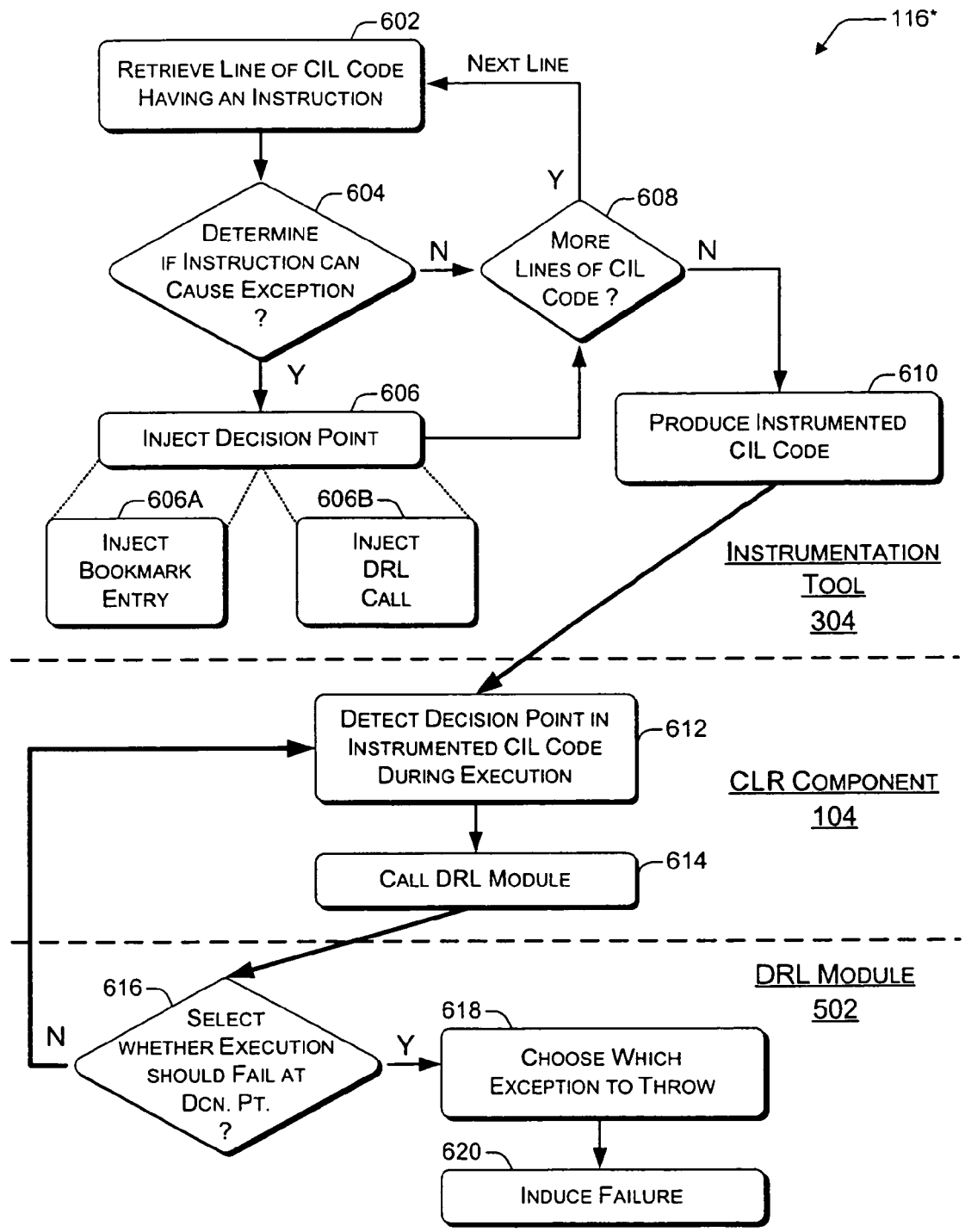
FIG. 6 is a flow diagram that illustrates an exemplary technique for instrumentation injection with regard to a common language runtime environment.

FIG. 6 is a flow diagram that illustrates an exemplary technique 116* for instrumentation injection with regard to a common language runtime environment. The flow diagram of exemplary technique 116* includes twelve (12) blocks 602-620 (including blocks 606A and 606B). Although the actions of these blocks 602-620 may be performed in other implementations, FIGS. 2-5 are used in particular to illuminate certain aspects of the technique.

For example, the flow diagram of exemplary technique 116* is divided into three parts: instrumentation tool 304, CLR component 104, and DRL module 502. As illustrated, instrumentation tool 304 performs the actions of blocks 602-610, CLR component 104 performs the actions of blocks 612-614, and DRL module 502 performs the actions of blocks 616-620. Although illustrated separately, one or more modules for DRL 502 may actually be executing within, as part of, and/or in conjunction with a CLR environment 104.

At block 602, a line of CIL code that has an instruction is retrieved. For example, a line of code that includes instruction 302 may be retrieved from CIL code 110 by instrumentation tool 304. At block 604, it is determined if the retrieved instruction is capable of causing an exception. For example, instrumentation tool 304 may determine if the retrieved instruction 302 can result in an exception (e.g., when executed by a CLR component 104) with reference to CIL specification 306.

As described above with reference to FIG. 5, DRL 502 can be configured to throw an exception based on instruction type. Similarly, instrumentation tool 304 can be configured to instrument a subset of those instructions 302 that meet a predetermined exception-related criterion. In other words, instrumentation tool 304 specifically, and instrumentation injection scheme 116A generally, may be configured to inject 208 decision points 206 for a particular instruction or set of instructions and/or a particular exception category. The determination action of block 604 can therefore entail determining whether the retrieved instruction is to be evaluated in a subsequent execution phase of reliability testing.

If the retrieved instruction is determined to be capable of causing an exception (at block 604), then a decision point is injected at block 606. For example, instrumentation tool 304 may inject a decision point 206 in association with the retrieved instruction 302 to form a test couplet 308. To inject the decision point (at block 606), a bookmark entry is injected at block 606A, and a DRL call is injected at block 606B. For example, as at least part of decision point 206, instrumentation tool 304 may inject bookmark entry 402 and call to DRL 404.

After the injection of the decision point (at block 606) or if the retrieved instruction is determined to not be capable of throwing an exception (at block 604), then flow continues at block 608. At block 608, it is ascertained whether there are more lines of CIL code to be analyzed. For example, instrumentation tool 304 may ascertain whether any additional lines of CIL code 110 remain to be analyzed for possible exception-throwing capabilities. If so, the next line is retrieved at block 602.

If, on the other hand, it is ascertained that there are no more lines of CIL code (at block 608), then flow continues at block 610. At block 610, instrumented CIL code is produced. For example, a transformation 202 that has been effectuated by instrumentation tool 304 on CIL code 110 with injection 208 of decision points 206 produces instrumented CIL code 204.

This instrumented CIL code 204 may optionally be stored on disk until the execution phase of reliability testing is to begin.

When the execution phase of reliability testing commences, the instrumented CIL code is JIT compiled and executed. For example, instrumented CIL code 204 may be provided to CLR component 104 for JIT compiling/execution 210. Each line of the instrumented CIL code is addressed by the CLR environment. For example, each instruction line of instrumented CIL code 204 is managed by CLR component 104.

Eventually, at block 612, a decision point in the instrumented CIL code is detected during execution thereof. For example, CLR component 104 may detect decision point 206 in instrumented CIL code 204. At block 614, a DRL module is called. For example, because of call to DRL 404 that is part of decision point 206, CLR component 104 calls DRL module 502.

At block 616, it is selectively decided whether execution of the instrumented CIL code is to fail at the detected decision point. For example, DRL module 502 evaluates the detected decision point 206 responsive to bookmark entry 402 and based on at least one TED logic factor 504. If it is decided that the detected decision point is not to result in a testing failure (at block 616), then flow continues at block 612 for the detection of another decision point during execution of the instrumented CIL code. For example, control may be returned to CLR component 104 so that execution of instrumented CIL code 204 may continue.

If, on the other hand, it is decided that the detected decision point is to result in a testing failure (at block 616), then which exception is to be thrown is chosen at block 618. For example, some instructions 302 can result in more than one type of exception being thrown (e.g., as stipulated by CIL specification 306). In such circumstances, a particular failure may be chosen that is context-appropriate, may be chosen randomly, may be chosen by exception area of concern, and so forth.

After the exception to be thrown is chosen (at block 618), a failure is induced at block 620. For example, DRL module 502 may induce a failure of CLR component 104 with respect to the instruction 302 that is associated with the detected decision point 206 in order to simulate an intended failure condition when testing CIL code 110 for reliability.

The aspects, features, schemes, etc. of FIGS. 1-5 and the technique(s) of FIG. 6, for example, are illustrated in diagrams that are divided into multiple blocks. However, the order and/or layout in which they are described and/or shown is not intended to be construed as a limitation, and any number of the blocks can be combined, rearranged, augmented, omitted, etc. in any manner to implement one or more systems, methods, devices, procedures, media, APIs, apparatuses, arrangements, etc. for instrumentation injection with regard to a common language runtime environment. Furthermore, although the description herein includes references to specific implementations such as those of FIGS. 2-6 (as well as the exemplary operating environment of FIG. 7), the approaches, schemes, and techniques thereof can be implemented in any suitable hardware, software, firmware, or combination thereof and using any suitable programming language(s), runtime environment(s), object-oriented paradigm(s), application programming interface(s), managed code mechanisms(s), and so forth.

Figure 7:
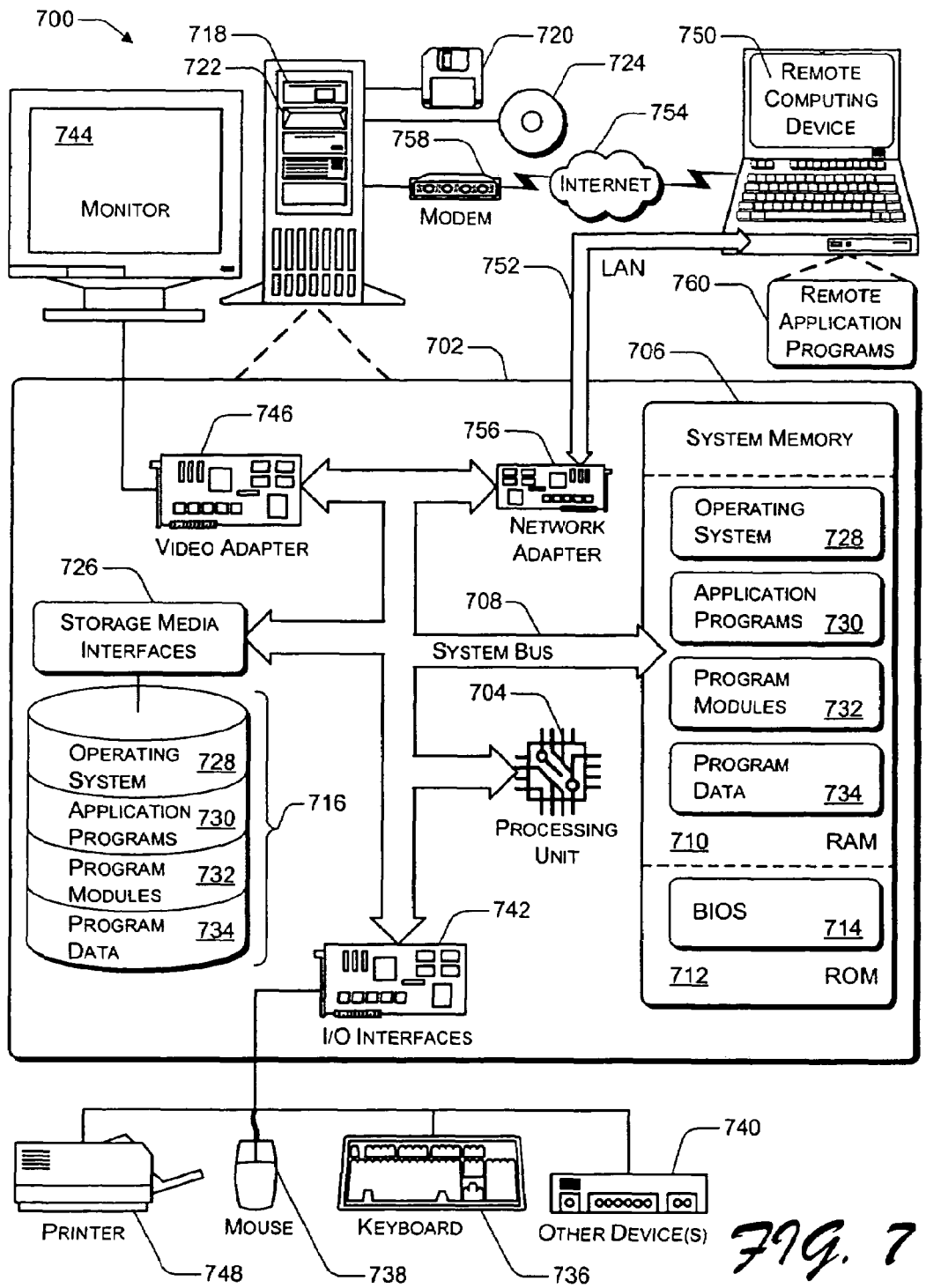
FIG. 7 illustrates an exemplary computing operating environment (or general computing device) that is capable of (wholly or partially) implementing at least one aspect of instrumentation injection with regard to a common language runtime environment as described herein.

FIG. 7 illustrates an exemplary computing operating environment 700 (or general computing device) that is capable of (fully or partially) implementing at least one system, device, media, component, approach, method, process, some combination thereof, etc. for instrumentation injection with regard to a common language runtime environment as described herein. Computing environment 700 may be utilized in the computer and network architectures described below or in a stand-alone situation.

Exemplary computing device operating environment 700 is only one example of an environment and is not intended to suggest any limitation as to the scope of use or functionality of the applicable computing device architectures (including those of computers, consumer electronics, game consoles, set-top boxes, mobile appliances, etc.). Furthermore, computing device environment 700 is not to be interpreted as having any dependency or requirement relating to any one or any combination of components as illustrated in FIG. 7. Moreover, the applicable computing devices are not limited by the processors/processing mechanisms employed therein. For example, such processors/processing mechanisms may include, but are not limited to, electronic integrated circuits (ICs), quantum computing, optical computing, mechanical computing (e.g., using nano technology), and so forth.

Additionally, instrumentation injection with regard to a common language runtime environment may be implemented with numerous other general purpose or special purpose computing device (including electronic device) environments or configurations. Examples of well known computing (device) systems, environments, and/or configurations that may be suitable for use include, but are not limited to, personal computers, server computers, thin clients, thick clients, personal digital assistants (PDAs) or mobile telephones, hand-held or laptop devices, multiprocessor systems, microprocessor-based systems, set top boxes, programmable consumer electronics, video game machines, game consoles, portable or handheld gaming units, network PCs, minicomputers, mainframe computers, distributed computing environments that include any of the above systems or devices, some combination thereof, and so forth.

Implementations for instrumentation injection with regard to a common language runtime environment may be described in the general context of processor-executable instructions. Generally, processor-executable instructions include routines, programs, objects, components, data structures, other code, etc. that perform particular tasks or implement particular abstract data types. Instrumentation injection with regard to a common language runtime environment, as described in certain implementations herein, may also be practiced in distributed computing environments where tasks are performed by remotely-linked processing devices that are connected through a communications link and/or network. Especially in a distributed computing environment, processor-executable instructions may be located in separate storage media, executed by different processors, and/or extant on or propagated over transmission media.

Computing device environment 700 includes a general-purpose computing device in the form of a computer 702, which may comprise any computing device with computing and/or processing capabilities. The components of computer 702 may include, but are not limited to, one or more processors or processing units 704, a system memory 706, and a system bus 708 that couples various system components including processor 704 to system memory 706.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another computing device, and it includes both volatile and non-volatile media, removable and non-removable media, and storage and transmission media.

System memory 706 includes processor-accessible storage media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD-ROM, DVD-ROM, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although exemplary computer 702 illustrates a hard disk 716, a removable magnetic disk 720, and a removable optical disk 724, it is to be appreciated that other types of processor-accessible media may store instructions that are accessible by a computing device, such as magnetic cassettes or other magnetic storage devices, flash memory, CD-ROM, digital versatile disks (DVD) or other optical storage, RAM, ROM, electrically-erasable programmable read-only memories (EEPROM), and so forth. Such media may also include so-called special purpose or hardwired integrated circuit (IC) chips. In other words, any processor-accessible media may be utilized to realize the storage media of the exemplary computing system and environment 700.

Any number of program modules (or other units or sets of processor-executable instructions) may be stored on hard disk 716, magnetic disk 720, optical disk 724, ROM 712, and/or RAM 710, including by way of general example, an operating system 728, one or more application programs 730, other program modules 732, and program data 734. By way of specific example but not limitation, instrumentation tool 304 and DRL 502 (of FIGS. 3, 5, and 6) may be all or a portion of any one or more of such program modules 728, 730, 732, and 734. Also, instrumented CIL code 204 and optional CIL specification 306 may be all or a portion of program data 734.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, scanner, and/or the like. These and other input devices are connected to processing unit 704 via input/output interfaces 742 that are coupled to system bus 708. However, they may instead be connected by other interface and bus structures, such as a parallel port, a game port, a universal serial bus (USB) port, an IEEE 1374 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a personal computer, a portable computer (e.g., laptop computer, tablet computer, PDA, mobile station, etc.), a palm or pocket-sized computer, a gaming device, a server, a router, a network computer, a peer device, other common network node, or another computer type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, other wireless networks, gaming networks, some combination thereof, and so forth. Such networks and communications connections, as well as the underlying physical hardware, are examples of transmission media.

When implemented in a LAN networking environment, computer 702 is usually connected to LAN 752 via a network interface or adapter 756. When implemented in a WAN networking environment, computer 702 typically includes a modem 758 or other means for establishing communications over WAN 754. Modem 758, which may be internal or external to computer 702, may be connected to system bus 708 via input/output interfaces 742 or any other appropriate mechanism(s). It is to be appreciated that the illustrated network connections are exemplary and that other means of establishing communication link(s) between computers 702 and 750 may be employed.

In a networked environment, such as that illustrated with computing device environment 700, program modules or other instructions that are depicted relative to computer 702, or portions thereof, may be fully or partially stored in a remote memory storage device. By way of example, remote application programs 760 reside on a memory component of remote computer 750 but may be usable or otherwise accessible via computer 702. Also, for purposes of illustration, application programs 730 and other processor-executable instructions such as program modules 732 and operating system 728 are illustrated herein as discrete blocks, but it is recognized that such programs, components, and other instructions reside at various times in different storage components of computing device 702 (and/or remote computing device 750) and are executed by data processor(s) 704 of computer 702 (and/or those of remote computing device 750).

Although systems, media, devices, methods, procedures, apparatuses, schemes, techniques, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more processor-accessible storage media comprising processor-executable instructions that, when executed, direct a device to perform actions comprising:
   determining if an instruction of a line of common intermediate language code meets a predetermined exception-related criterion; and
   if so, injecting a decision point in association with the instruction of the line of common intermediate language code, wherein:
   the decision point enables a decision as to whether an exception is to be thrown with respect to the instruction;
   the action of injecting a decision point comprises an action of injecting a bookmark entry, wherein the action of injecting a decision point further comprises an action of:
      injecting a call to a decision runtime library, the decision runtime library comprising a program that is adapted to evaluate whether the exception is to be thrown with respect to the instruction by utilizing at least one throw exception decision (TED) logic factor, wherein the TED logic factor comprises one of the following:
         random; and
         first path, wherein the first path TED logic factor throws an exception when encountering a particular decision point along a new execution path using an identifier of the particular decision point and one or more stack values;
   the bookmark entry including an instruction type indicator that indicates an instruction type for the instruction of the line of common intermediate language code.

2. The one or more processor-accessible storage media as recited in claim 1 comprising the processor-executable instructions that, when executed, direct the device to perform further actions comprising:
   retrieving the line of common intermediate language code from a common intermediate language code program prior to the determining;
   retrieving another line of common intermediate language code from the common intermediate language code program; and
   repeating the action of determining and the action of injecting a decision point for an instruction of the retrieved other line of common intermediate language code.

3. The one or more processor-accessible storage media as recited in claim 1, wherein the action of determining comprises an action of:
   determining if the instruction of the line of common intermediate language code is capable of throwing an exception.

4. The one or more processor-accessible storage media as recited in claim 1, wherein the action of determining comprises an action of:
   determining if the instruction of the line of common intermediate language code is capable of throwing an exception and is related to a pre-selected exception area.

5. The one or more processor-accessible storage media as recited in claim 1, wherein the action of determining comprises an action of:
   determining if the instruction of the line of common intermediate language code is capable of throwing an exception with reference to a common intermediate language code specification.

6. The one or more processor-accessible storage media as recited in claim 1, wherein the bookmark entry
   further includes an identifier that uniquely identifies the decision point within the common intermediate language code that is being instrumented.

7. The one or more processor-accessible storage media as recited in claim 1, wherein at least a portion of the processor-executable instructions comprise at least part of an instrumentation tool that produces instrumented common intermediate language code from the common intermediate language code by repeating the actions of determining and injecting a decision point for a plurality of respective instructions of a plurality of respective lines of the common intermediate language code.

8. A device comprising:
   a processor;
   a memory device, the memory device encoded with:
      instrumented common intermediate language code that includes a test couplet corresponding to a decision point and an associated instruction, the associated instruction capable of causing a fault;
      a decision runtime library that is adapted to evaluate the test couplet to selectively decide whether to throw an exception responsive to a bookmark entry and based on at least one throw exception decision (TED) logic factor selected from the group comprising:
         throwing an exception randomly; and
         throwing an exception when encountering a particular decision point along each new execution path using an identifier of the particular decision point and one or more stack values; and
      a common language runtime component that interprets the decision point so as to call the decision runtime library prior to executing the associated instruction;
      wherein the decision point comprises the bookmark entry and a call to the decision runtime library, and wherein the bookmark entry comprises an indication of an instruction type of the associated instruction and an identifier of the decision point.

9. The device as recited in claim 8, wherein the instrumented common intermediate language code is in a binary form.

10. The device as recited in claim 8, wherein the decision runtime library is further adapted to evaluate the test couplet to selectively decide whether to throw an exception responsive to the bookmark entry and based on throw exception decision logic.

11. The device as recited in claim 8, wherein the decision runtime library is further adapted to evaluate the test couplet to selectively decide whether to throw an exception responsive to the indication of the instruction type of the associated instruction.

12. The device as recited in claim 8, wherein the decision runtime library is (i) modularized by exception category and/ or (ii) operative in dependence on an instruction type of the associated instruction as determinable by the indication of the instruction type from the bookmark entry.

13. An arrangement for enabling reliability testing of managed code, the arrangement including one or more processor-accessible storage media device; wherein the arrangement comprises:

instrumentation means for instrumenting common intermediate language code with a plurality of decision points to produce instrumented common intermediate language code;

wherein the instrumentation means comprises:

analysis means for analyzing whether individual instructions of a plurality of instructions of the common intermediate language code can result in a failure; and injection means for injecting a respective decision point in association with each respective individual instruction, which can result in a failure as analyzed by the analysis means, of the plurality of instructions of the common intermediate language code;

wherein the injection means comprises:

means for injecting a call to a decision runtime library, the decision runtime library comprising a program that is adapted to evaluate whether an exception is to be thrown with respect to the instruction by utilizing at least one throw exception decision (TED) logic factor, wherein the TED logic factor comprises one of the following:

random; and first path, wherein the first path TED logic factor throws an exception when encountering a particular decision point along a new execution path using an identifier of the particular decision point and one or more stack values;

means for injecting a respective bookmark entry that indicates an instruction type of the respective individual instruction associated with the respective decision point; and decision means for deciding whether to throw an exception at each decision point of the plurality of decision points.

14. The arrangement as recited in claim 13, wherein the respective bookmark entry further identifies the respective decision point.

15. The arrangement as recited in claim 13, wherein the injection means further comprises:

means for injecting a call at least one module that is capable of evaluating the respective decision point with regard to whether a failure is to be induced.

16. The arrangement as recited in claim 13, further comprising:

common language runtime means for executing the instrumented common intermediate language code and the decision means in a runtime environment.

17. The arrangement as recited in claim 16, wherein the decision means operates while the instrumented common intermediate language code is being executed when the common language runtime means calls the decision means at each decision point of the plurality of decision points.

18. The arrangement as recited in claim 13, wherein the decision means comprises:

evaluation means for evaluating whether to throw an exception responsive to the respective bookmark entry of each respective decision point of the plurality of decision points and based on at least one throw exception decision logic factor.

19. The arrangement as recited in claim 13, wherein the arrangement comprises at least one device having the one or more processor-accessible storage media.

20. A method for instrumentation injection with regard to a common language runtime environment, the environment comprising a processor, the method comprising:

determining whether an instruction from common intermediate language code is capable of causing an exception; and if so, injecting a decision point in association with the instruction to mark the instruction for evaluation during a common language runtime execution, the evaluation involving a decision as to whether a failure is to be induced with respect to the instruction; wherein the injecting a decision point comprises of injecting a bookmark entry, wherein the action of injecting a decision point further comprises an action of:

injecting a call to a decision runtime library, the decision runtime library comprising a program that is adapted to evaluate whether an exception is to be thrown with respect to the instruction by utilizing at least one throw exception decision (TED) logic factor, wherein the TED logic factor comprises one of the following:

random; and first path, wherein the first path TED logic factor throws an exception when encountering a particular decision point along a new execution path using an identifier of the particular decision point and one or more stack values;

the bookmark entry including an instruction type indicator that indicates an instruction type for the instruction of the line of common intermediate language code.

21. The method as recited in claim 20, wherein the determining comprises:

determining whether the instruction from the common intermediate language code is capable of causing an exception and is (i) related to a pre-selected exception category and/or (ii) of a pre-selected instruction type.

22. The method as recited in claim 20, wherein the injecting a decision point further comprises:

injecting an identifier of the decision point.

23. One or more processor-accessible storage media comprising processor-executable instructions that, when executed, direct a device to perform the method as recited in claim 20.

24. The method as recited in claim 20, further comprising:

repeating the determining and the injecting a decision point for a plurality of instructions from the common intermediate language code; and producing instrumented common intermediate language code as a result of the repeating.

25. The method as recited in claim 20, further comprising: selectively deciding whether the execution is to fail at the decision point.

26. The method as recited in claim 25, further comprising: if it is decided at the selectively deciding that the execution is to fail at the decision point, then choosing which exception of at least two exceptions is to be thrown.

27. The method as recited in claim 25, further comprising: if it is decided at the selectively deciding that the execution is to fail at the decision point then inducing a failure in the execution of the common language runtime with respect to the instruction.

* * * * *

UNITED STATES PATENT AND TRADEMARK OFFICE
CERTIFICATE OF CORRECTION

| | | |
|---|---|---|
| PATENT NO. | : 7,421,682 B2 | Page 1 of 1 |
| APPLICATION NO. | : 10/705754 | |
| DATED | : September 2, 2008 | |
| INVENTOR(S) | : Robert E. Viehland et al. | |

It is certified that error appears in the above-identified patent and that said Letters Patent is hereby corrected as shown below:

In column 11, line 50, in Claim 2, after "claim 1" insert -- , --.

In column 14, line 61, in Claim 27, after "point" insert -- , --.

Signed and Sealed this

Nineteenth Day of April, 2011

David J. Kappos
*Director of the United States Patent and Trademark Office*